(12) United States Patent
Zelechonok

(10) Patent No.: US 11,957,997 B1
(45) Date of Patent: Apr. 16, 2024

(54) LIQUID CHROMATOGRAPHY METHOD FOR SEPARATION OF MULTICHARGED IONS

(71) Applicant: Yury Zelechonok, Northbrook, IL (US)

(72) Inventor: Yury Zelechonok, Northbrook, IL (US)

(73) Assignee: SIELC Technologies Corporation, Wheeling, IL (US)

( * ) Notice: Subject to any disclaimer, the term of this patent is extended or adjusted under 35 U.S.C. 154(b) by 89 days.

(21) Appl. No.: 17/582,821

(22) Filed: Jan. 24, 2022

(51) Int. Cl.
*B01D 15/36* (2006.01)
*B01D 15/16* (2006.01)

(52) U.S. Cl.
CPC ......... *B01D 15/166* (2013.01); *B01D 15/362* (2013.01); *B01D 15/363* (2013.01)

(58) Field of Classification Search
CPC ... B01D 15/166; B01D 15/362; B01D 15/363
See application file for complete search history.

(56) References Cited

PUBLICATIONS

Okada, T., "Design of chromatographic and electrophorectic separation based on ion-pair formation of aromatic disulfonates with polyammonium ions", Analytic Chemistry, 1996, 68, pp. 1158-1163. (Year: 1996).*

Karcher, B.D., and I.S. Krull, "The use of complexing eluents for the high performance liquid chromatographic determination of metal species", In I.S. Krull (Ed.), "Trace metal analysis and speciation" Journal of Chromatography Library Series, vol. 47, pp. 123-166. (Year: 1991).*

Doyle, J., et al., "A multicomponent mobile phase for ion chromatography applied to the separation of anions from the residue of low explosives", Analytical Chemistry, 72, pp. 2302-2307. (Year: 2000).*

Mansour, F., et al., "Ion exclusion chromatography of aromatic acids", Journal of Chromatographic Science, 51, pp. 655-665. (Year: 2013).*

Muenter, M., et al., "Simultaneous separation of inorganic ions and neutral organics on ion-exchange stationary phases", Journal of Chromatography A, 844, pp. 39-51. (Year: 1999).*

Zelechonok, Y., et al., "New mode of liquid chromatography separation: a new mode of separation using multi-charged ions in the mobile phase for high-performance liquid chromatography", 45, pp. 3520-3528. (Year: 2022).*

Lucy, Charles A., and Sarah Pelletier. "Advances in Fast Ion Chromatography." European Pharmaceutical Review. Mar. 24, 2006. Internet URL: https://www.europeanpharmaceuticalreview.com/article/2835/advances-in-fast-ion-chromatography/. Retrieved Apr. 13, 2022.

Doneanu, Catalin E., Weiblin Chen, and John C. Gebler, "Impurity Evaluation of Heparin Sodium by Anion Exchange Chromatography." American Laboratory. Oct. 1, 2009. Internet URL: https://www.americanlaboratory.com/914-Application-Notes/560-Impurity-Evaluation-of-Heparin-Sodium-by-Anion-Exchange-Chromatography/. Retrieved Apr. 13, 2022.

* cited by examiner

*Primary Examiner* — Benjamin L Lebron
(74) *Attorney, Agent, or Firm* — John C. Shepard (57) ABSTRACT

The present invention pertains to a liquid chromatography method of separating multicharged ions, and more particularly, to separating both positively charged and negatively charged ions by using a mobile phase composition with doubly charged ions and an ion-exchange column with a charged stationary phase surface.

18 Claims, 10 Drawing Sheets

Poly(L-Lysine)
TFA  MW 2,400

Tartrazine

| Column: | Primesep S2 |
|---|---|
| Column size: | 4.6 × 150 mm |
| Mobile phase: | MeCN/H₂O - 80/20 % |
| Flow rate: | 1.0 mL/min |
| Detection: | 260 nm |

TEA

TMDAP

8a — MP buffer - TEA 5 mM pH5.0

8b — MP buffer - TMDAP 5 mM pH5.0

0   10   20   30   40   min

Fig. 8

Enoxaparin

Column: Primesep S2
Column size: 4.6 × 150 mm
Mobile phase:
A: 60% MeCN with 10 mM N,N'-Dimethylpiperazine pH 4.0 with AcOH
B: 10% MeCN with 10 mM N,N'-Dimethylpiperazine pH 4.0 with AcOH
Gradient: 100% A for 5 min then 100% B for 7 min
Flow rate: 1.0 mL/min
Detection: ELSD, temperature 70° C 1. Sodium
2. Enoxaparin

LIQUID CHROMATOGRAPHY METHOD FOR SEPARATION OF MULTICHARGED IONS

BACKGROUND OF THE INVENTION

Technical Field

The present invention relates to a liquid chromatography method for analyzing and separating multicharged molecules and, more particularly, to a liquid chromatography method which is not based on an ion-exchange mechanism of ion separation.

Background Art

Typically, liquid chromatography employs a mobile phase ("MP") and a stationary phase contained within a column. A sample to be analyzed is injected into a mobile phase flow and the stationary phase separates or retains sample components prior to the mobile phase passing through a detector.

Liquid chromatography ("LC") is a powerful tool in the separation of ionic and neutral compounds. In LC, a sample is separated into its various components that can be subsequently analyzed by a detector. Four main types of chromatography are responsible for the majority of small molecule separations, namely, normal phase ("NP"), reverse phase ("RP"), ion-exclusion, and ion-exchange chromatography ("IEC"). Typically, each mode of separation requires a specifically tailored stationary phase.

Particularly for separation of ions, special ion-exchange columns were developed and are now widely used in analytical and preparative scales of separation.

Cation-exchange columns are used for separation of cations and for that they are constructed to have a negatively charged surface of the stationary phase. Anion-exchange columns are used for separation of anions and for that they are constructed to have a positively charged surface of the stationary phase.

It is also possible to separate ions of the same charge as the stationary phase surface in so-called ion-exclusion mode of chromatography, but this mode of separation has limited application due to a very narrow separation window.

In IEC, the analytes have an affinity to the stationary phase due to strong electrostatic interaction. Thus, positively charged analytes are strongly retained on negatively charged IEC columns and negatively charged analytes are strongly retained on positively charged IEC columns. Degree of affinity of the charged analyte to the oppositely charged column surface depends in large part on the number of charges the particular analyte ion has, but other factors such as the geometry of the particular ion, the structure of the solvation layer formed by water around the ion, and other factors that can play a role. This degree of affinity is a basis for separation of different ions on the same column during one separation cycle.

In order to facilitate an ion-exchange process, an aqueous mobile phase is typically used with additives capable of generating ions while dissolved in water.

Those ions compete with analytes for the surface of the stationary phase, thereby creating the ion-exchange process. Typical additives are water soluble salts, acids, bases, and pH buffers.

A typical example of such separation is in the analysis of the mixture of basic cations $Li^+$, $Na^+$, $K^+$, and $NH$ or the separation of acidic anions $Cl^-$, $I^-$, $Br^-$, and $NO_3^-$.

Many organic molecules of medical, pharmaceutical, industrial, environmental interest can exist in an ionic form at specific pH. Examples of such molecules are amino acids, DNA, RNA, proteins and peptides, neurotransmitters, many drugs, carboxylic acids, vitamins, surfactants, herbicides, etc. Although the IEC is well established, any new process of separation of the ions has an importance in expanding the tools of their measurement and purification.

One inherent problem of the IEC is the near exponential increase of retention time of the charged analytes with an increase of the number of charges in the molecules of the analytes. Thus, analytes with two charges can retain two times longer on a column than similar analytes with only one charge. Problems become very significant when the number of charges increases beyond two and especially more so when multicharged analytes such as proteins, peptides, DNA, RNA, ionic polymers, and other multicharged molecules need to be separated and analyzed. The typical approach for such separation is to use a very high concentration of the ionic modifier in the mobile phase.

One example of such separation is in the analysis of heparin on a SAX anion exchange column. Very high ion-strength of the mobile phase up to 2M is required to perform such analysis on a SAX anion exchange column. If the number of charges in the analyte molecule becomes too high, an irreversible absorption is often observed regardless of how high ion-strength the mobile phase that is used. This often causes the column efficiency to decline or even the complete loss of column performance.

BRIEF SUMMARY OF THE INVENTION

The present invention is directed to overcoming the problems as set forth above.

A primary object of the present invention is to make chromatographic conditions where any charged molecule with any number of positive or negative charges can be retained but eventually eluted with a simple mobile phase without high buffer concentration.

Another object of the present invention is to provide a liquid chromatography method that separates molecules based primarily on their charge number and not on other molecular properties.

In one exemplary embodiment, an anion-exchange column with a positively charged stationary phase is used. The mobile phase used comprises a mixture of water with an organic solvent such as acetonitrile ("MeCN") and a doubly charged ionic modifier, such as sulfuric acid ("$H_2SO_4$") or other doubly negatively charged ions, in small concentration thereby allowing the retention and separation of multicharged molecules, such as peptides, polyamines, diquats, etc. Examples of the results of such a chromatographic process are presented in FIGS. 1-5.

In another exemplary embodiment, a cation-exchange column with a negatively charged stationary phase is used. The mobile phase used comprises a mixture of water with an organic solvent, such as MeCN and a doubly charged ionic modifier, such as Mg or other doubly positively charged inorganic or organic ions, in small concentration thereby allowing the retention and separation of multi-negatively charged molecules, such as sulfates, sulfonates, polyphosphate, oligonucleotides, acidic dyes, etc. Examples of such a chromatographic process are presented in FIGS. 7-9.

BRIEF DESCRIPTION OF THE DRAWINGS

The details of construction and operation of the invention are more fully described with reference to the accompanying drawings which form a part hereof.

In the drawings.

All figures are drawn for ease of explanation of the basic teachings of the present invention only. The extensions of the figures will be explained or will be within the skill of the art after the following teachings of the present invention have been read and understood.

DETAILED DESCRIPTION OF THE PREFERRED EMBODIMENTS

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

This invention generally relates to high pressure liquid chromatography ("HPLC") and to ultra high pressure liquid chromatography ("UHPLC"), and more specifically to ion chromatography, but is not limited thereto and may be employed in other fields as well.

The liquid chromatography method disclosed herein uses a stationary phase in an ion-exchange column and a mobile phase with an organic modifier and a small amount of multiply charged molecules to produce chromatographic separations that can be readily detected and measured.

Components of the mobile phase carrying the sample include the following: a solvent, such as water; an organic modifier, such as acetonitrile ("MeCN"), methanol ("MeOH"), tetrahydrofuran ("THF"), ethanol ("EtOH"), or isopropanol ("IPA"); multiply charged molecules, such as the those that will be described below; and if needed, a pH adjuster, such as acetic acid ("AcOH"). The modifier may comprise between 0% and 98% of the mobile phase.

In chromatography, any substance added to water is typically called a modifier. Herein, an inorganic or ionic modifier will be referred to as a buffer and an organic solvent will be referred to as an organic modifier.

Electrostatic interaction of ions with a charged stationary phase of the IEC column requires an opposite charge of the analyte and the column surface. As will be seen herein, this is not an absolute requirement. When the chromatography method disclosed herein is employed, retention of positively charged analytes in a column can be achieved on positively charged surfaces so long as the mobile phase comprises an ionic doubly charged negative component. Correspondingly, retention of negatively charged analytes in a column can be achieved on negatively charged surfaces so long as the mobile phase comprises an ionic doubly charged positive component.

An example of a doubly negatively charged component is diluted $H_2SO_4$ in a concentration below 5%. Other examples of doubly charged anions are organic molecules like tetrafluorosuccinic acid and similar molecules with two and more carboxyl groups. Examples of doubly charged inorganic acid anions include carbonic acid ("$H_2CO_3$") and phosphoric acid ("$H_3PO_4$"). Correspondingly, examples of doubly charged ionic components are positive cations, such as $Ca^{2+}$, $Mg^{2+}$, $Cu^{2+}$, and ethylenediamine or its homologs in concentrations less than 1%. Homologs of ethylenediamine are 1,1,2,2-tetramethylethylendiamine, propylenediamine, and other molecules with two or more basic groups. As seen herein, suitable results are obtained with concentrations of doubly charged ionic components below 5%, and in some analyses, suitable results can be obtained with concentrations below 1%.

Figure 1:
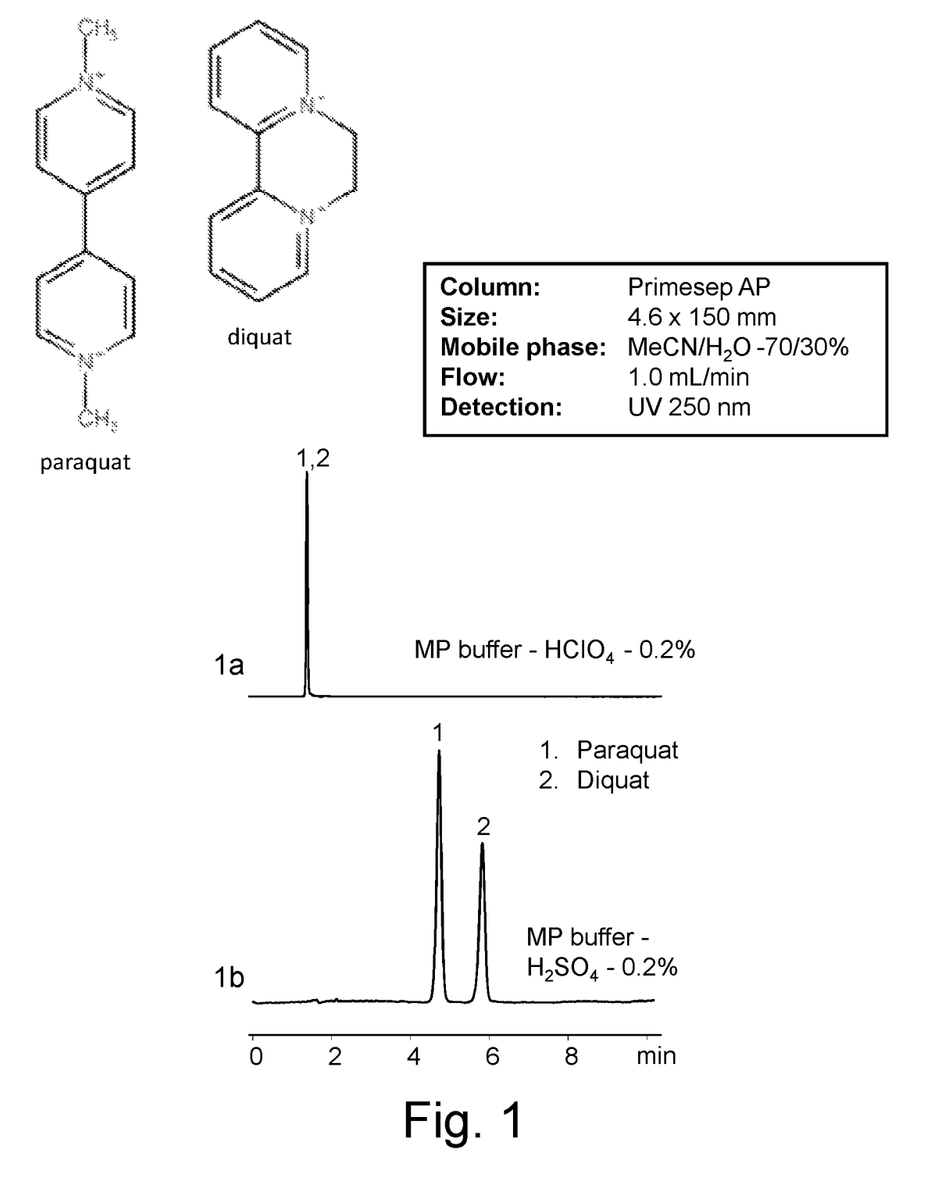
FIG. 1 shows examples of chromatograms resulting from the separation of paraquat and diquat when employing the method set forth in the inset with mobile phase buffers $HClO_4$ and $H_2SO_4$ using an anion-exchange column as disclosed herein and shows the formulas for paraquat and diquat.

FIG. 1 shows the chromatographic results of an analysis separating a sample containing paraquat and diquat using a Primesep AP anion-exchange column. The Primesep AP column is manufactured by SIELC Technologies Corporation of Wheeling, Illinois. As indicated in the FIG. 1 inset listing the parameters of the chromatography method employed, the mobile phase used was a mixture of 70%

MeCN and 30% water ("H$_2$O"). Plot 1a in FIG. 1 shows little or no retention of paraquat and diquat when a singly charged buffer of HClO$_4$ was used at a concentration of 0.2% w/v. Peaks occurring in chromatography in less than 2 minutes usually indicate that the sought after sample components have not been retained within the column. Plot 1b in FIG. 1 shows the resulting peaks distinctly indicating the presence of paraquat and diquat when a buffer of H$_2$SO$_4$ was used at a concentration of 0.2% w/v.

The formulas for paraquat and diquat are shown in FIG. 1.

Figure 2:
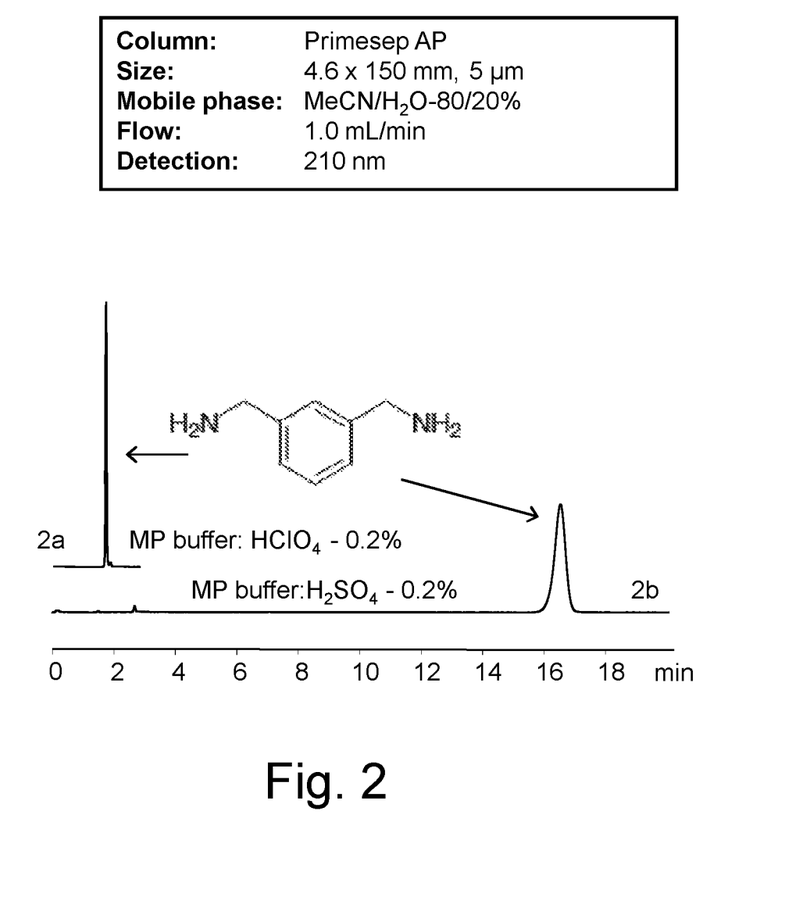
FIG. 2 shows examples of chromatograms resulting from the separation of xylylenediamine when employing the method set forth in the inset with mobile phase buffers of $HClO_4$ and $H_2SO_4$ using an anion-exchange column as disclosed herein and shows the formula for xylylenediamine.

FIG. 2 shows the chromatographic results of an analysis separating samples containing xylylenediamine using a Primesep AP anion-exchange column. As indicated in the FIG. 2 inset listing the parameters of the chromatography method employed, the mobile phase used was a mixture of 80% MeCN and 20% H$_2$O. Plot 2a in FIG. 2 shows little or no retention indicating the presence of xylylenediamine when a singly-charged buffer of HClO$_4$ was used at a concentration of 0.2% w/v. Plot 2b in FIG. 2 shows the resulting peak distinctly indicating the presence and retention of xylylenediamine when a buffer of H$_2$SO$_4$ was used at a concentration of 0.2% w/v.

The formula for xylylenediamine is shown between the arrows pointing to the plot peaks in FIG. 2.

Expectedly, no retention was observed when the doubly charged ionic component (plots 1b and 2b) was replaced with a singly charged ionic component (plots 1a and 2a) in the mobile phase. When H$_2$SO$_4$ was used with the mobile phase (plots 1b and 2b), these compounds were retained 5, 6 and 16 minutes.

In accordance with the method described herein, the retention and separation of charged molecules by a column is mainly based on a number of charged groups in the molecule as they are in classical IEC. In IEC, the ion-strength of the mobile phase needs to be changed in order to control retention of analytes. In the novel method set forth herein, the concentrations of an organic modifier is changed instead. The concentration of the buffer can be held constant.

Figure 3:
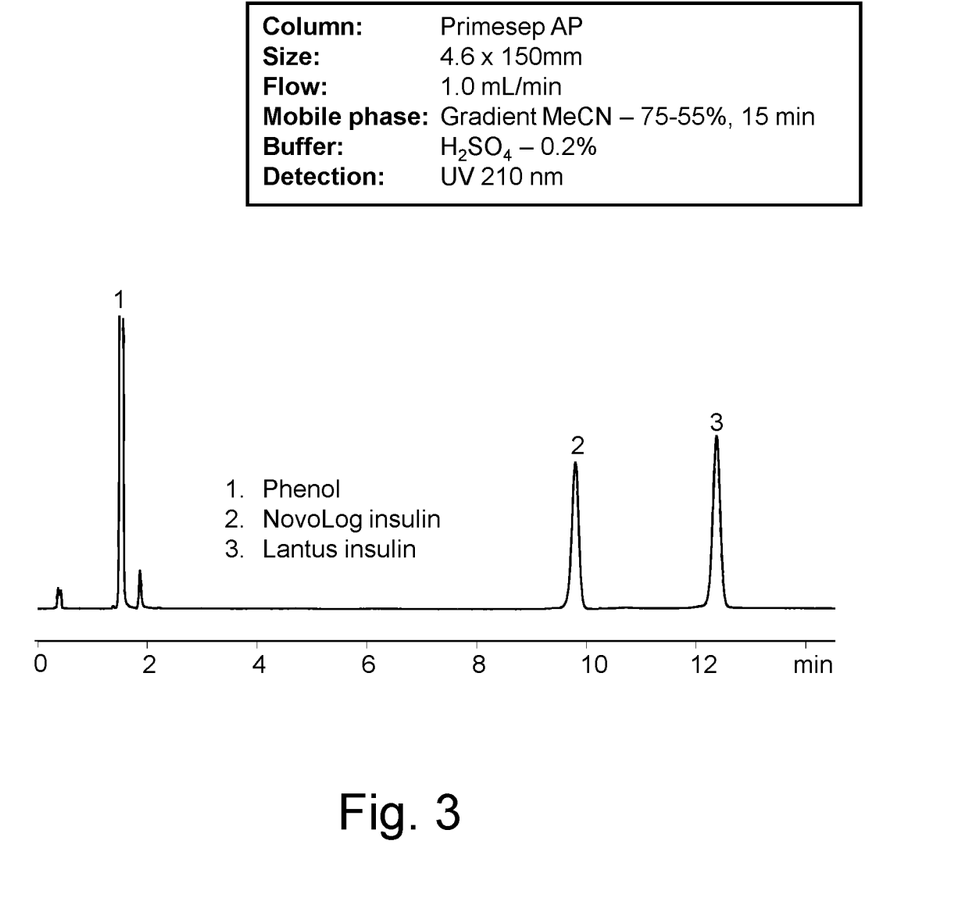
FIG. 3 shows an example of a chromatogram resulting from the separation of phenol, Novolog insulin, and Lantus insulin when employing the method set forth in the inset using an anion-exchange column as disclosed herein.

FIG. 3 shows the chromatographic results of an analysis separating a sample containing phenol, Novolog insulin, and Lantus insulin using a Primesep AP anion-exchange column. As indicated in the FIG. 3 inset listing the parameters of the chromatography method employed, the mobile phase used was a gradient beginning with a mixture of 75% MeCN and 25% H$_2$O and ending with a mixture of 55% MeCN and 45% H$_2$O. The plot in FIG. 3 shows the resulting peaks indicating the significant retention of Novolog insulin and Lantus insulin when a doubly-charged buffer of H$_2$SO$_4$ was used at a concentration of 0.2% w/v. FIG. 3 shows the separation and retention of insulin analogs based on their number of positive charges. The retention of these analytes was controlled by the organic modifier gradient from 75% to 55%.

Figure 4:
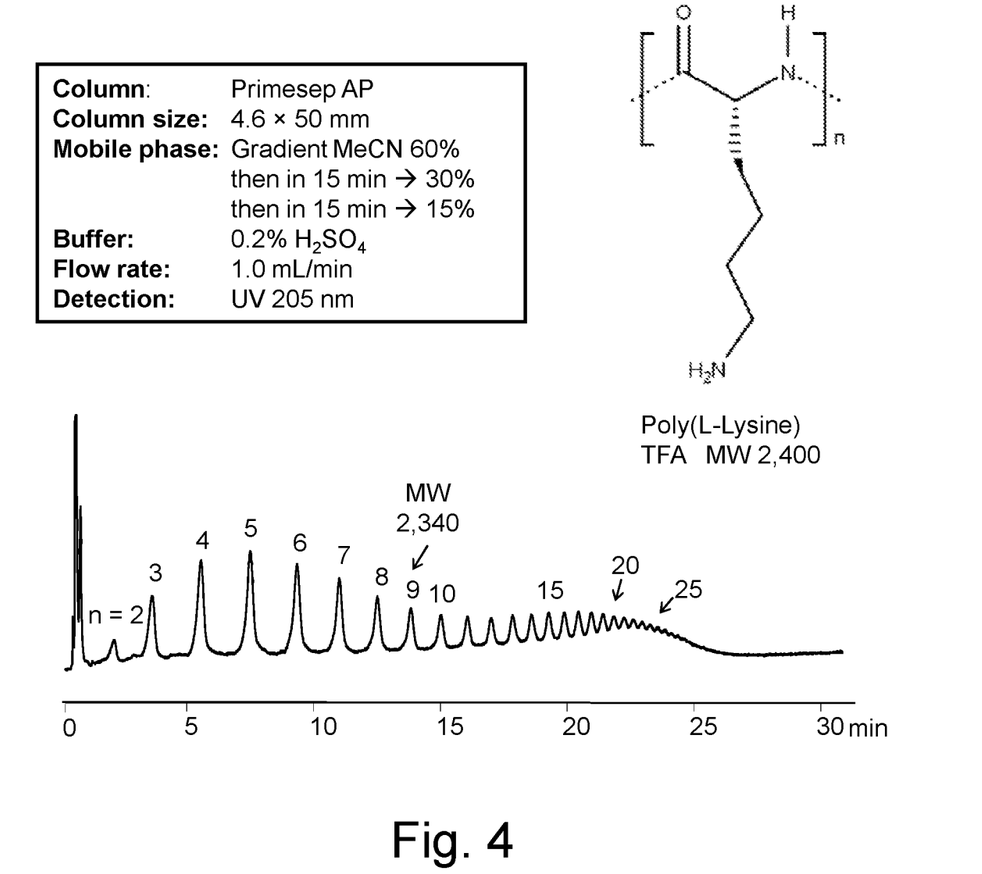
FIG. 4 shows an example of a chromatogram resulting from the separation of polylysine when employing the method set forth in the inset using an anion-exchange column as disclosed herein and shows the formula for polylysine.

FIG. 4 shows the chromatographic results of an analysis separating a sample containing Poly(L-Lysine) using a Primesep AP anion-exchange column. As indicated in the FIG. 4 inset listing the parameters of the chromatography method employed, the mobile phase used was a gradient beginning with a mixture of 60% MeCN and 40% H$_2$O, changed during 15 minutes to a mixture of 30% MeCN and 70% H$_2$O, and then changed during another 15 minutes to a mixture of 15% MeCN and 85% H$_2$O. The plot in FIG. 3 shows the resulting peak indicating the presence and retention of Poly(L-Lysine) oligomers when a doubly charged buffer of H$_2$SO$_4$ was used at a concentration of 0.2% w/v.

FIG. 4 show the results of separating oligolysines based on the number of lysine amino acids in the molecule. Each unit of the lysine is positively charged in the acidic mobile phase. Gradual decreases in concentration of MeCN in the mobile phase allows the separation of oligolysines according to the number of charges in the molecule.

Figure 5:
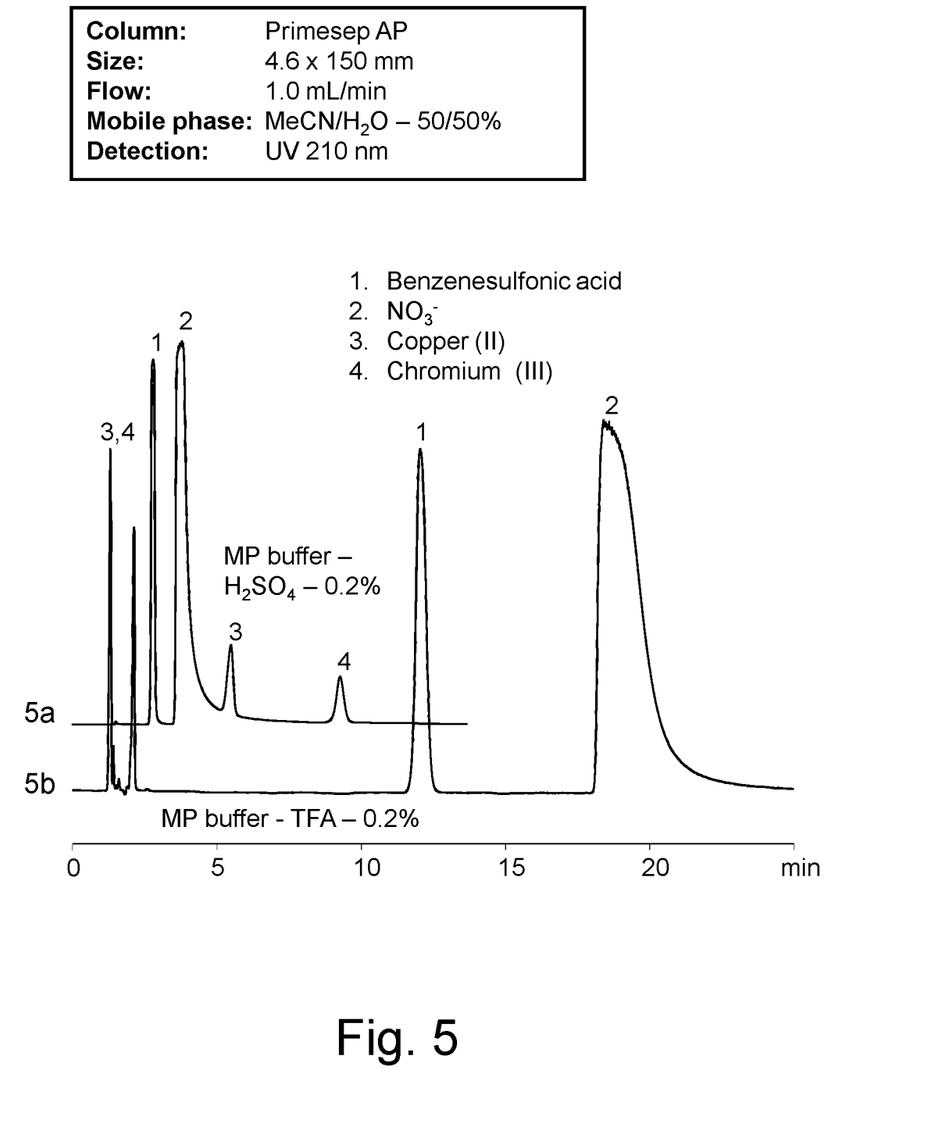
FIG. 5 shows examples of chromatograms resulting from the separation of benzenesulfonic acid, nitrate ions, copper (II) ions, and chromium (III) ions when employing the method set forth in the inset with mobile phase buffers of TFA and $H_2SO_4$ using an anion-exchange column as disclosed herein.
Figure 6A:
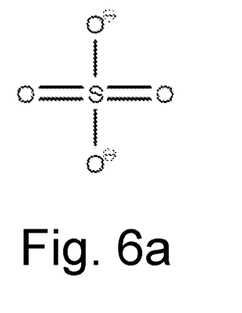
FIG. 6*a* shows the formula for a sulfuric acid ion.
Figure 6B:
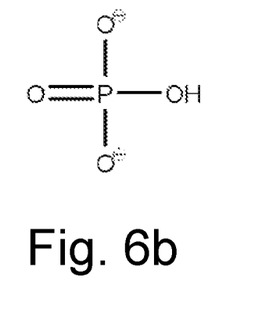
FIG. 6*b* shows the formula for a phosphoric acid ion.
Figure 6C:
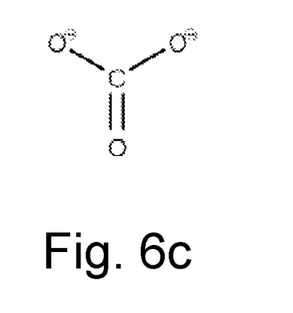
FIG. 6*c* shows the formula for a carbonic acid ion.
Figure 6D:
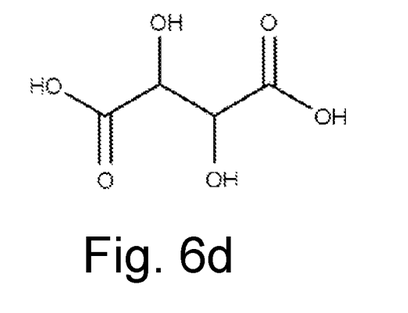
FIG. 6*d* shows the formula for tartaric acid.
Figure 6E:
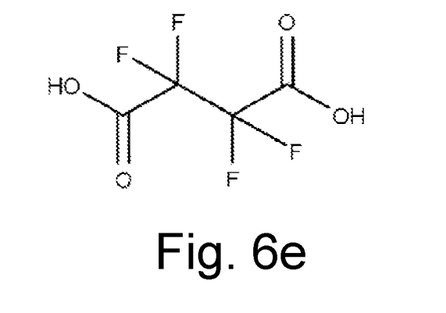
FIG. 6*e* shows the formula for tetrafluorosuccinic acid.
Figure 6F:
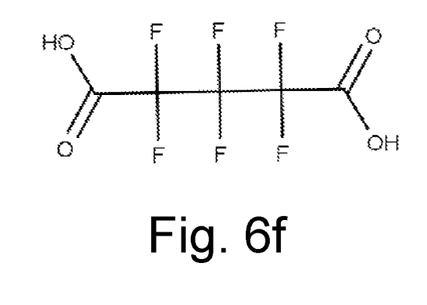
FIG. 6*f* shows the formula for hexafluoroglutaric acid.
Figure 6G:
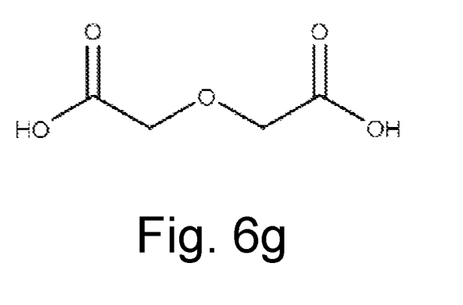
FIG. 6*g* shows the formula for diglycolic acid.

FIG. 5 shows the chromatographic results of an analysis separating a sample containing copper (II) ions and chromium (III) ions in the presence of benzenesulfonic acid and nitric acid using a Primesep AP anion-exchange column. As indicated in the FIG. 5 inset listing the parameters of the chromatography method employed, the mobile phase used was a mixture of 50% MeCN and 50% H$_2$O. Plot 5a in FIG. 5 shows the resulting peaks indicating the presence and retention of benzenesulfonic acid, nitrate ions ("NO$_3^-$"), copper (II) ions, and chromium (III) when a buffer of H$_2$SO$_4$ was used at a concentration of 0.2% w/v. Plot 5b in FIG. 5 shows little or no retention of copper (II) ions and chromium (III) when a singly charged buffer of trifluoroacetic acid ("TFA") was used at a concentration of 0.2% w/v.

Similar to the previously described methods, inorganic cations can be separated based on their charge number. Replacement of the doubly charged ionic modifier H$_2$SO$_4$ (FIG. 5a) with the singly charged modifier trifluoroacetic acid ("TFA") (FIG. 5b) leads to a total loss of retention of copper and chromium ions.

FIG. 6 lists some examples of doubly charged anion modifiers that can be used in the chromatography method described herein. FIG. 6a shows the formula for a sulfuric acid ion. FIG. 6b shows the formula for a phosphoric acid ion. FIG. 6c shows the formula for a carbonic acid ion. FIG. 6d shows the formula for tartaric acid. FIG. 6e shows the formula for tetrafluorosuccinic acid. FIG. 6f shows the formula hexafluoroglutaric acid. FIG. 6g shows the formula for diglycolic acid. It is understood that many other doubly charged molecules are available and they all can be used in this process.

Many dyes are multicharged molecules. In case of acidic dyes, the presence of sulfate and/or carboxylic groups creates negatively charged ions in solution. With the method disclosed herein, such molecules can be retained and separated efficiently using a negatively charged column and a mobile phase that is a composition of water with an organic modifier and an ionic modifier bearing at least two positive charges in the molecule. Such an ionic modifier can be an inorganic ion, such as Mg$^{2+}$, Ca$^{2+}$, Cu$^{2+}$, and similar ions. Organic diamines can be used similarly to provide a doubly charged positive ionic modifier to the mobile phase in accordance with the method disclosed herein.

Figure 7:
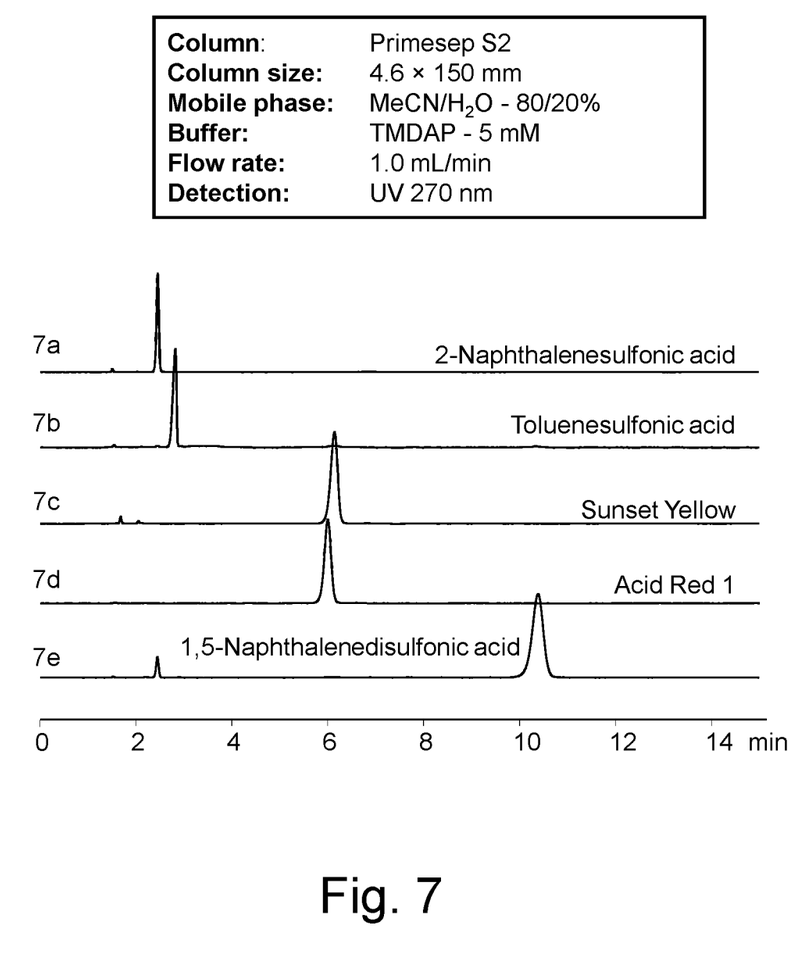
FIG. 7 shows examples of chromatograms resulting from the separation of 2-naphthalenesulfonic acid, toluenesulfonic acid, sunset yellow, acid red 1, and 1,5-naphthalenesulfonic acid when employing the method set forth in the inset using a cation-exchange column as disclosed herein.

FIG. 7 shows the chromatographic results of an analysis separating samples containing 2-naphthalenesulfonic acid, toluenesulfonic acid, sunset yellow (an organic azo dye), acid red 1 (a red azo dye), and 1,5-naphthalenesulfonic acid using a Primesep S2 cation-exchange column. The Primesep S2 column is manufactured by SIELC Technologies Corporation of Wheeling, Illinois. As indicated in the FIG. 7 inset listing the parameters of the chromatography method employed, the mobile phase used was a mixture of 80% MeCN and 20% H$_2$O and adding 5 mM of N,N,N',N'-tetramethyldiaminopropane ("TMDAP") with acetic acid as a buffer.

Plot 7a in FIG. 7 shows the resulting peak indicating the presence and retention of 2-naphthalenesulfonic acid. Plot 7b shows the resulting peak indicating the presence and retention of toluenesulfonic acid. Plot 7c shows the resulting peak indicating the presence and retention of sunset yellow. Plot 7d shows the resulting peak indicating the presence and retention of acid red 1. Plot 7e shows the resulting peak indicating and retention the presence of 1,5-naphthalenesulfonic acid.

Figure 8:
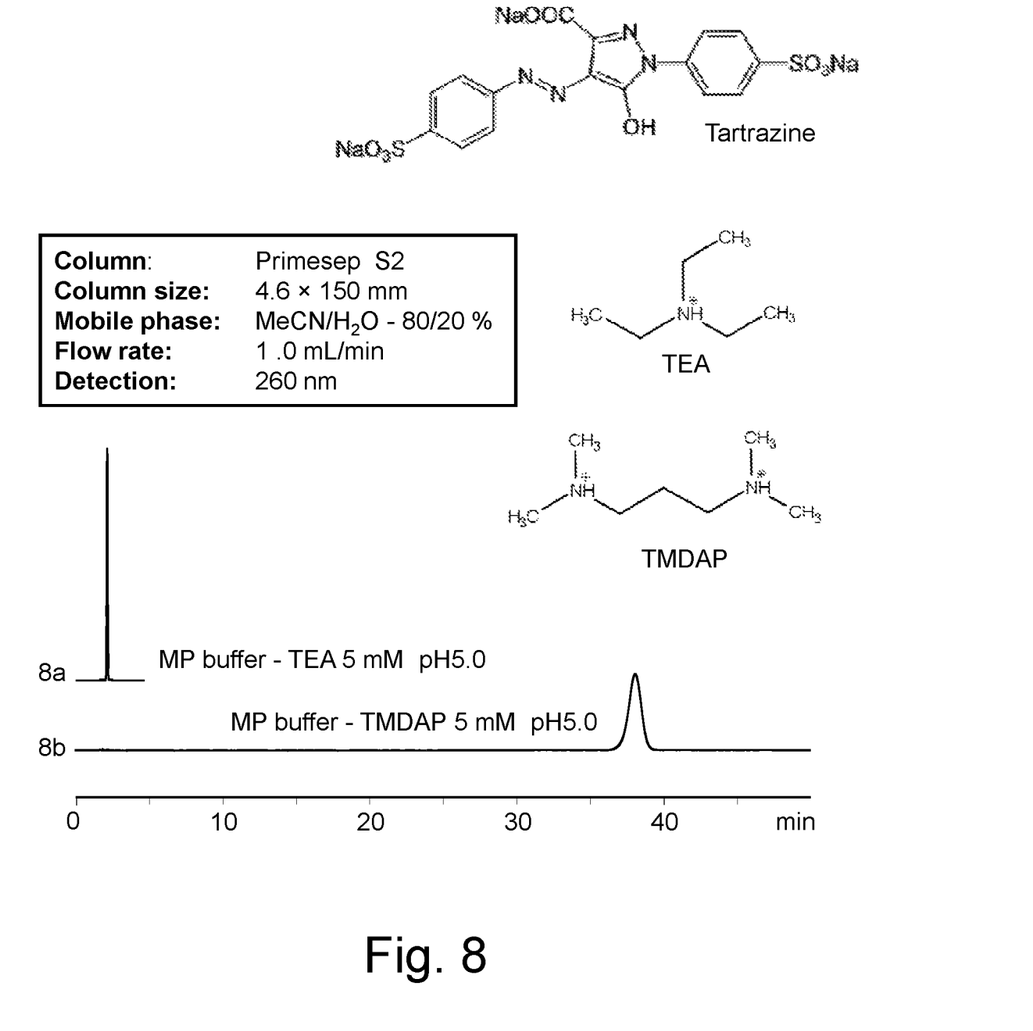
FIG. 8 shows examples of chromatograms resulting from the separation of tartrazine when employing the method set forth in the inset using mobile phase buffers of TEA and TMDAP using a cation-exchange column as disclosed herein and shows the formulas for tartrazine, TEA, and TMDAP.

FIG. 8 shows the chromatographic results of an analysis separating a sample containing tartrazine using a Primesep S2 cation-exchange column. As indicated in the FIG. 8 inset listing the parameters of the chromatography method employed, the mobile phase used was a mixture of 80% MeCN and 20% H$_2$O. Plot 8a in FIG. 8 shows little or no retention when a buffer of triethylamine ("TEA") was used at a concentration of 5 mM. Plot 8b in FIG. 8 shows the resulting peak indicating the presence and retention of tartrazine when a buffer of TMDAP was used at a concentration of 5 mM. In this example illustrated by plots 8a and 8b, if the singly charged ionic modifier TEA is used, the retention of the acidic dye tartrazine is totally lost as shown in plot 8a. With the doubly charged modifier TMDAP, a retention time of 37 minutes was demonstrated as shown in FIG. 8b.

The formulas for tartrazine, triethylamine, and N,N,N',N'-tetramethyldiaminopropane are shown in FIG. 8.

Figure 9:
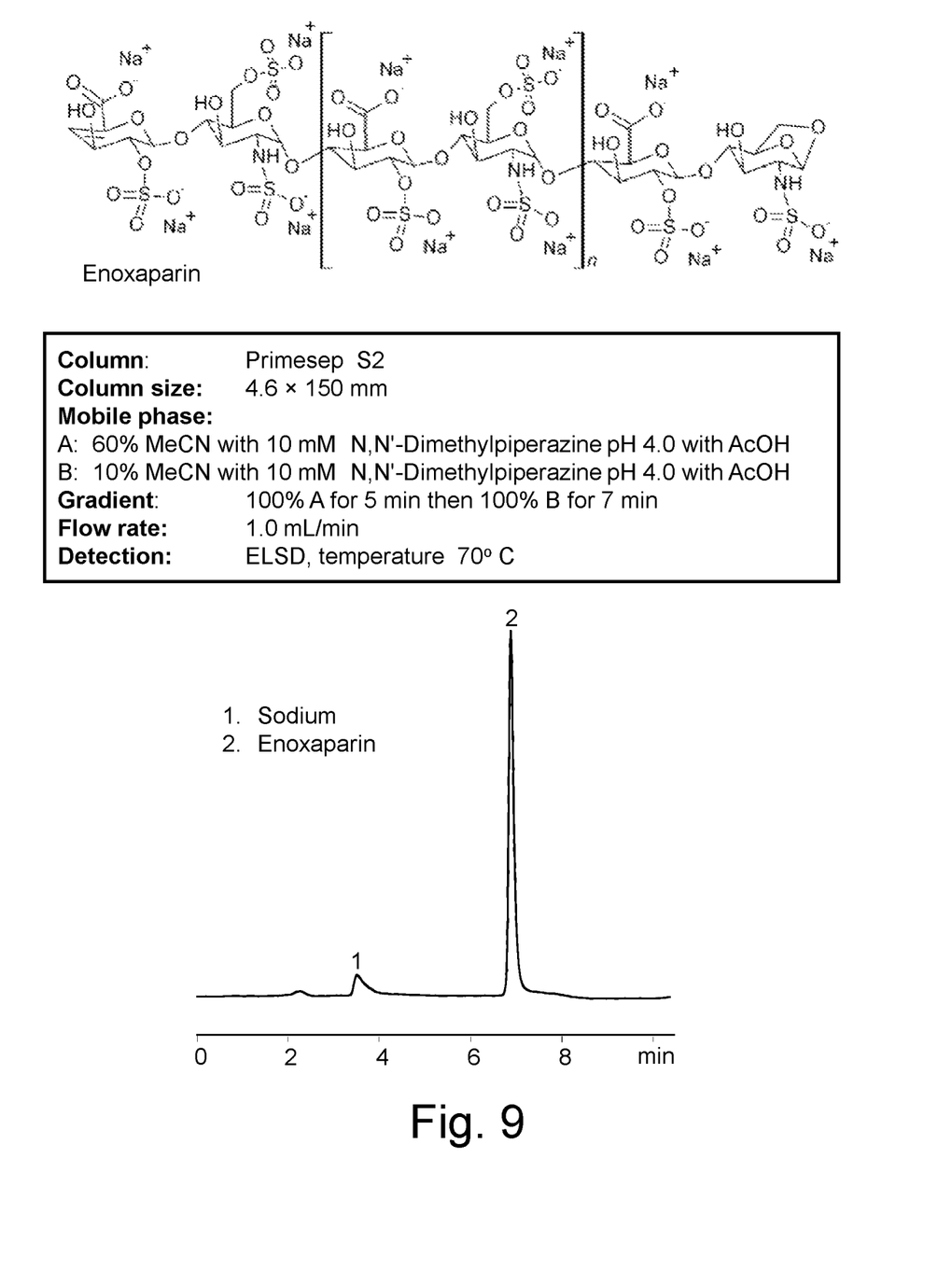
FIG. 9 shows examples of chromatograms resulting from the separation of sodium and Enoxaparin when employing the method set forth in the inset using a cation-exchange column as disclosed herein and shows the formula for Enoxaparin; and, FIG. 10*a* shows the formula for tetramethylethylene-1,2-diamine.
Figure 10A:
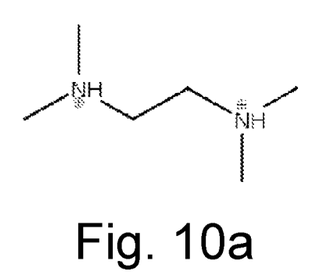
Figure 10B:
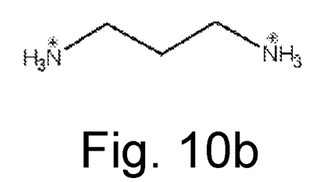
FIG. 10*b* shows the formula for propylene-1,3-diamine.
Figure 10C:
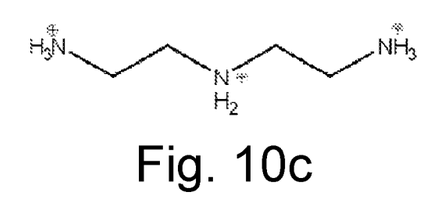
FIG. 10*c* shows the formula for diethylenetriamine.
Figure 10D:
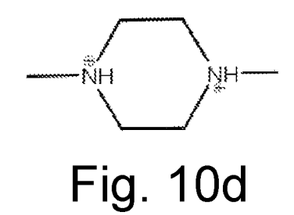
FIG. 10*d* shows the formula for N,N'-dimethylpiperazine.
Figure 10E:
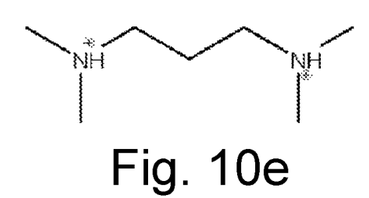
FIG. 10*e* shows the formula for N,N,N',N', tetramethyldiaminopropane.
Figure 10F:
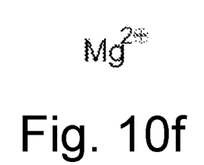
FIG. 10*f* shows the notation for a magnesium (II) ion.
Figure 10G:
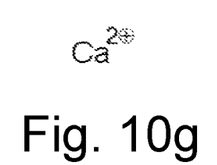
FIG. 10*g* shows the notation for a calcium (II) ion.
Figure 10H:
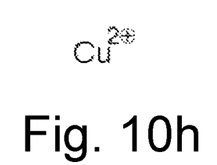
FIG. 10*h* shows the notation for a copper (II) ion.

FIG. 9 shows the chromatographic results of an analysis separating a sample containing of Enoxaparin sodium using a Primesep S2 cation-exchange column. As indicated in the FIG. 9 inset listing the parameters of the chromatography method employed, the mobile phase used was a step gradient beginning with a mixture of 60% MeCN with a buffer of 10 mM N,N'-dimethylpiperazine pH 4.0 with AcOH as a pH adjuster for 5 minutes followed by a mixture of 10% MeCN with the same buffer for 7 minutes. The plot in FIG. 9 shows the resulting peaks indicating the presence and retention of Enoxaparin.

Multicharged molecules such as Enoxaparin can be efficiently retained and eluted from a column having the same negative charge as the Enoxaparin when the mobile phase component is a doubly charged organic molecule with the structure:

wherein n>1, and R1, R2, R3, and R4 are independently selected from the group consisting of a hydrogen atom and an alkyl substitute. The structural formula for Enoxaparin is shown in FIG. 9.

FIG. 10 shows examples of doubly charged positive organic cations and doubly charged positive inorganic cations. FIG. 10a shows the formula for the organic molecule tetramethylethylene-1,2-diamine. FIG. 10b shows the formula for the organic molecule propylene-1,3-diamine. FIG. 10c shows the formula for the organic molecule diethylenetriamine. FIG. 10d shows the formula for the organic molecule N,N'-dimethylpiperazine. FIG. 10e shows the formula for the organic molecule N,N,N',N', tetramethyldiaminopropane. FIG. 10f shows the notation for the magnesium (II) ion. FIG. 10g shows the notation for the calcium (II) ion. FIG. 10h shows the notation for the copper (II) ion.

It is understood that many other doubly charged positive molecules are available and most of them can be used as a cation modifier suitable for the method described herein.

What is claimed is:

1. A liquid chromatography method employing a mobile phase and an ion-exchange column for the separation of charged molecules from a sample, the method comprising:
using a mobile phase of water mixed with a modifier component and a doubly charged ion component, the doubly charged ion component having a charge of a type opposite the charged molecule in the sample; and, using an ion-exchange column having a stationary phase charge of a type opposite the charge of the doubly charged ion component.

2. The method claim 1 wherein the ion-exchange column is an anion-exchange column and the doubly charged ion component is comprised of doubly charged negative anions.

3. The method of claim 2 wherein the modifier component is an organic component.

4. The method of claim 2 wherein the modifier component is acetonitrile.

5. The method of claim 2 wherein the modifier component is selected from the group consisting of methanol, tetrahydrofuran, ethanol, and isopropanol.

6. The method of claim 2 wherein the modifier component comprises more than 0% and less than 98% of the mobile phase.

7. The method of claim 2 wherein the doubly charged ion component comprises less than five percent of the mobile phase.

8. The method of claim 2 wherein the doubly charged ion component comprises less than one percent of the mobile phase.

9. The method of claim 2 wherein the doubly charged ion component is selected from the group consisting of sulfuric acid ions, phosphoric acid ions, carbonic acid ions, tartaric acid, tetrafluorosuccinic acid, hexafluoroglutaric acid, and diglycolic acid.

10. The method claim 1 wherein the ion-exchange column is a cation-exchange column and the doubly charged ion component is comprised of doubly charged positive cations.

11. The method of claim 10 wherein the modifier component is an organic component.

12. The method of claim 10 wherein the modifier component comprises between more than 0% and less than 98% of the mobile phase.

13. The method of claim 10 wherein the doubly charged ion component comprises less than five percent of the mobile phase.

14. The method of claim 10 wherein the doubly charged ion component comprises less than one percent of the mobile phase.

15. The method of claim 10 wherein the doubly charged ion component is selected from the group consisting of tetramethylethylene-1,2-diamine, propylene-1,3-diamine, diethylenetriamine, N,N'-dimethylpiperazine, and N,N,N',N'-tetramethyldiaminopropane.

16. The method of claim 10 wherein the doubly charged ion component is an alkyl diamine with the general structure wherein n is a number >1 and R1, R2, R3, and R4 are independently selected from the group consisting of hydrogen and alkyl substitutes.

17. The method of claim 10 wherein the doubly charged ion component is selected from the group consisting of magnesium (II) ions, calcium (II) ions, and copper (II) ions.

18. The method of claim 1 wherein the ion-exchange column is a cation-exchange column, the modifier component is an organic component, and the doubly charged ion component is selected from the group consisting of tetramethylethylene-1,2-diamine, propylene-1,3-diamine, diethylenetriamine, N,N'-dimethylpiperazine, and N,N,N',N'-tetramethyldiaminopropane.

\* \* \* \* \*